April 5, 1960   J. W. WIESMANN   2,931,212
BUILDING AND COMBINATION AIR AND WIRE DISTRIBUTING STRUCTURE
Filed July 7, 1955   3 Sheets-Sheet 1

INVENTOR.
Joseph W. Wiesmann
BY J. Stanley Churchill
ATTORNEY

April 5, 1960 J. W. WIESMANN 2,931,212
BUILDING AND COMBINATION AIR AND WIRE DISTRIBUTING STRUCTURE
Filed July 7, 1955 3 Sheets-Sheet 2

INVENTOR.
Joseph W. Wiesmann
BY
J. Stanley Churchill
ATTORNEY

April 5, 1960  J. W. WIESMANN  2,931,212
BUILDING AND COMBINATION AIR AND WIRE DISTRIBUTING STRUCTURE
Filed July 7, 1955  3 Sheets-Sheet 3

INVENTOR.
Joseph W. Wiesmann
BY
J. Stanley Churchill
ATTORNEY

United States Patent Office 2,931,212
Patented Apr. 5, 1960

2,931,212

BUILDING AND COMBINATION AIR AND WIRE DISTRIBUTING STRUCTURE

Joseph W. Wiesmann, Pittsburgh, Pa., assignor to H. H. Robertson Company, Pittsburgh, Pa., a corporation of Pennsylvania Application July 7, 1955, Serial No. 520,443

1 Claim. (Cl. 72—16)

This invention relates to a building and combination air and wire distributing structure.

One object of the invention is to provide a novel building and combination air and wire distributing structure embodying a metallic cellular load supporting floor including a plurality of generally parallel cells forming potential air and wire distributing conduits which enables selected of the cells forming the potential air conduits to be used to distribute heated air and other cells to be used as wire distributing cells with provisions for servicing the wire distributing cells in a manner such as to minimize the excessive heating of the wiring and thereby prevent injury to the insulation thereof.

A further object of the invention is to provide a novel building and combination air and wire distributing structure of the character described embodying cellular metal floors of the type illustrated in the United States patent to Young, No. 1,867,433, and in which individual wire distributing cells or a selected few cells are serviced by a plurality of relatively small individual wiring conduits containing a relatively small number of wires so as to minimize the effect of transmission of heat from the hot air cells to the individual conduits and thus prevent injury to the wiring extended therethrough.

With these general objects in view and such others as may hereinafter appear the invention consists in the building and combination air and wire distributing structure hereinafter described and particularly defined in the claims at the end of this specification.

In the drawings illustrating the preferred embodiment of the invention:

Figure 1:
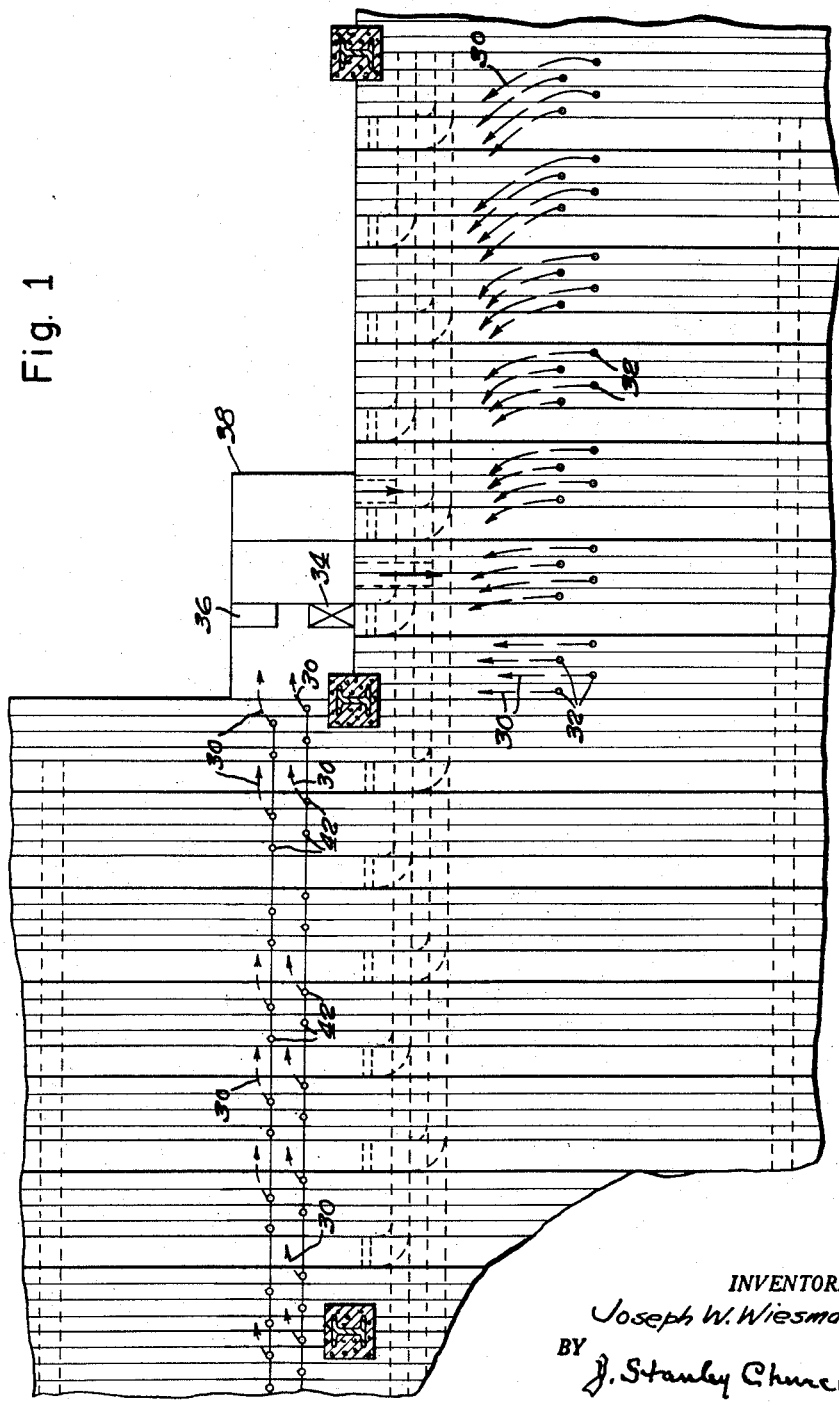
Fig. 1 is a plan view of the present building and combination air and wire distributing structure.

In general the present invention pertains to a building and combination air and wire distributing structure which may be used for the various purposes of ventilation, for exhausting air from within the building, for heating and/or for cooling a part or all of the building and also for general air conditioning purposes.

The invention contemplates a structure which finds particular use in a multi-storied building wherein a cellular metal floor, such as is illustrated in the United States patent to Young above referred to, forms the load supporting floor at one or more stories of the building, and is erected upon the usual beams constituting a part of the steel framework of the building. At each story of the building provision is made for forcing air into selected of the floor cells at one portion of the floor whereby the air may flow through the floor cells and be permitted to flow outwardly into selected portions of the building in order to provide the desired ventilation, heating or air conditioning of the building.

Selected cells or groups of cells of cellular metal floors have heretofore been extensively used as wire carrying ducts, and the cellular steel floors manufactured and sold by H. H. Robertson Company, of Pittsburgh, Pennsylvania, assignees of the Yong patent above referred to, illustrate the type of floor which may and preferably will form the cellular flooring component of the present building and combination air and wiring distributing structure. In practice in such cellular metal floors selected cells are used for carrying the wiring for one or more types of electrical service, such for example as 110 volt electrical service, low tension electrical service, for telephone service and for other signal systems. The wiring systems for these various electrical services are usually brought into the building to a panel or other supply point and from such a panel the wiring is run through crossover ducts or headers extending transversely across a large number of the flooring cells either above or below the floor and usually from one side of the building to another. Suitable openings are provided to enable the proper wires of the different services to be fished from the supply headers or crossover ducts through the selected floor cells to be withdrawn at desired points in the building through outlets in the floor cells. In practice the cellular steel floor is manufactured in unit widths and standard lengths, each unit usually embodying a number of cells, usually four, and these floor units are erected in end to end relation and in contiguous side by side relation to form the complete floor. In practice also the crossover ducts or supply headers have comprised metal conduits which have been erected in contact with the upper or lower surfaces of the various cells of the several floor units across which these crossover ducts or headers have been extended.

While the foregoing structure of combination floor and wiring distributing system has proven successful in the large number of buildings in which the same has been employed during the last twenty years, the arrangement of crossover ducts or supply headers is not satsfactory when it is desired to also utilize some of the non-wire-carrying cells for conducting air heated to above room temperature, or systems for heating or air conditioning the building because of the transmission of heat from those cells carrying the heated air into the supply headers and the injury or liability of injury of the insulation of the wiring over a substantial period of time. In such prior crossover ducts or supply conduits a relatively large number of wires are extended therethrough for servicing a relatively large number of cells extending across the floor of the building, and in practice the inherent resistance of the wires causes losses that are dissipated in the form of heat. In accordance with the present invention provision is made for servicing the cells by a plurality of relatively small conduits containing a relatively small number of wires so as to avoid concentration of such heat losses, and so that when such conduits pass in proximity to the hot air cells the additional heat transmitted from the hot air cells to the conduits will not increase the temperature to an extent such as to adversely affect the insulation of the wiring in the conduits. In one embodiment of the invention individual cells are provided with individual wiring conduits carrying only the wires for servicing such cells, and in another embodiment of the invention selected of the cells are connected by transversely extended conduits or headers having a plurality of individual supply conduits for servicing a relatively few cells whereby to prevent accumulation of a large number of wires in any one conduit for the purpose described. In practice the wiring cells are preferably arranged in transversely spaced groups, the wiring for a particular service running through two or more cells of the group, and the air carrying cells may be disposed between adjacent groups of the wiring cells.

Figure 2:
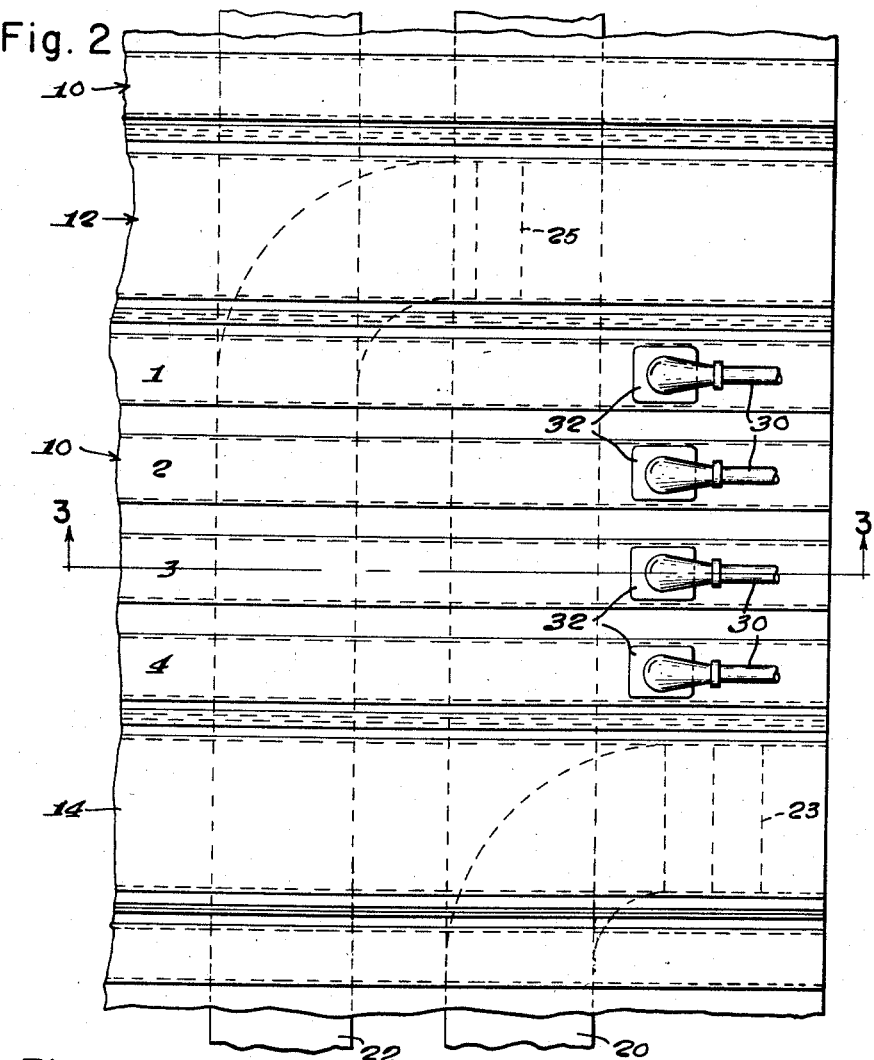
Fig. 2 is a plan view detail of a portion of the present building and combination air and wire distributing structure shown in Fig. 1.
Figure 3:
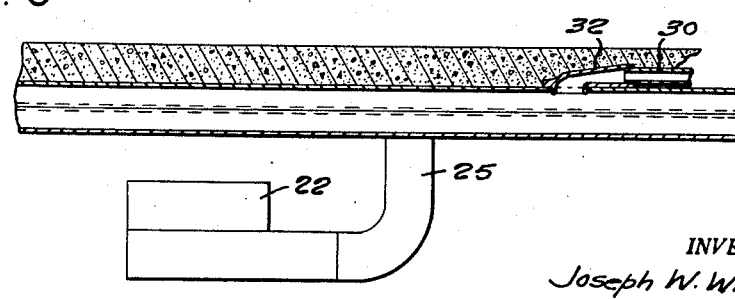
Fig. 3 is a cross sectional view taken on the line 3—3 of Fig. 2.
Figure 4:
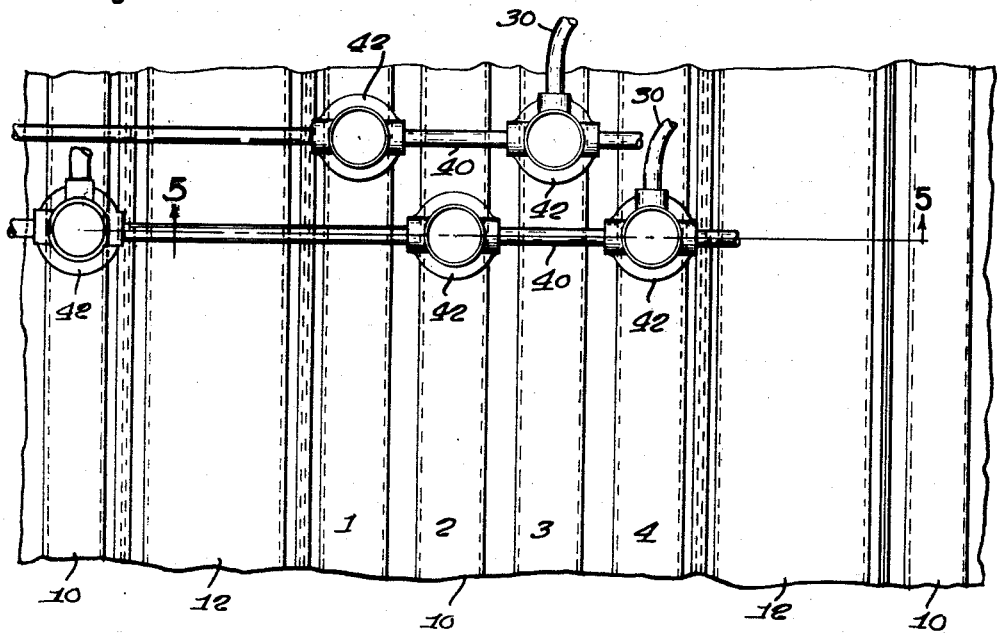
Fig. 4 is a plan view detail of another portion of the present building and combination air and wire distributing structure shown in Fig. 1.
Figure 5:
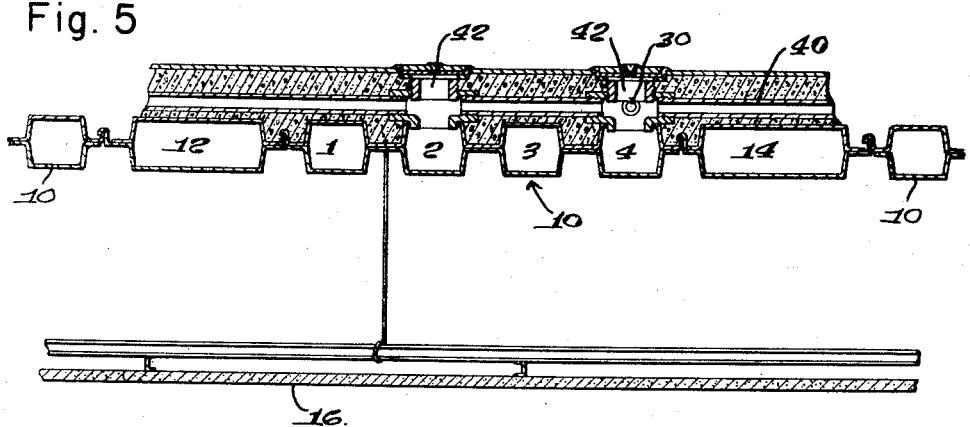
Fig. 5 is a cross sectional view taken on the line 5—5 of Fig. 4.

Referring now to the drawings, in Figs. 1, 2 and 4 I have illustrated a sufficient portion of the present building and combination wire and air distributing structure to enable the invention to be understood. As therein illustrated, the structure includes a load supporting cellular metal floor, of the type above referred to, produced in accordance with the disclosure of the Young patent above referred to. This cellular metal floor in practice is made in standard units, and in the erection of these units in a building a series of the units are laid end to end over the supporting beams of the framework of the building and form in effect continuous raceways or cells, herein shown as four in number for each unit, which comprise potential conduits for carrying either wire or air from one part of a building to another. Preferably, however, each standard four-cell unit 10 may be used for wiring services and is preferably erected with enlarged cellular units 12, 14 on each side thereof so that, as illustrated in Figs. 1 and 2, four potential wiring ducts are interposed between each pair of air carrying cell units 12, 14. It will be understood that the present load supporting cellular metal floor may embody any form and number of potential wiring or potential air carrying cells provided that a series of groups of wiring cells are interposed laterally between a pair of potential air carrying cells. In practice a furred ceiling may be suspended from the load supporting floor as indicated at 16 in Fig. 5.

As typical of an installation of the present building and combination wire and air distributing structure, I have shown in Fig. 2 a pair of supply air ducts 20, 22. The supply duct 20 transversely extended under the floor may be utilized for the supply of cold air and is connected by a header connection indicated at 23 to the cold air carrying cell 14. The supply duct 22 may be utilized to carry heated air, that is air heated to above room temperature, and this air duct 22 extends transversely under the floor, and both are of a size such as to pass through the space between the suspended ceiling 16 and the floor. The duct 22 is connected by the header connection 25 to the potential air duct 12 which will be hereinafter referred to as the "hot air duct."

For purposes of illustration the several potential wiring cells of the standard unit of the load supporting floor may be designated as cells 1, 2, 3 and 4, and it will be understood that electrical wiring will be run into one end of at least some of the cells of the floor unit at a point adjacent a wall or portion of the building at which the ends are exposed to permit such introduction of wiring into the cells, or in some instances the wiring may be introduced initially into the cells through suitable inlet openings at the top or bottom of the floor cells at a point adjacent the supply point or panel to which the particular electrical service is supplied at the particular floor of the building under consideration. As herein shown, cells Nos. 1 and 3 have been designated as cells for carrying the wiring for 110 v. lighting services, and cells Nos. 2 and 4 have been designated as cells for carrying the wiring for telephone services.

In the illustrated embodiment of the invention the individual conduits for supplying wiring service to the cells are preferably spaced a short distance above the cellular metal flooring units and are embedded in the concrete floor fill to provide an entirely concealed wire distribution system. As shown in Fig. 1, the conduits 30 are connected to fittings 32 in communication with openings in the upper walls of each individual cell and through which the wires may be fished from the service supply points or panels, herein indicated as a 110 v. panel 34 and a telephone panel 36 disposed in the service core 38 of the building. This type of fitting is practical in the location shown wherein fishing of the wires longitudinally of individual cells only is required, that is, wherein no communication between individual spaced cells is required. Thus, each individual conduit 30 carries only a relatively small number of wires to service its individual wire distributing cell so as to prevent accumulation of a relatively large mass of wiring in any one conduit, so that the heat generated by the resistance of the wiring in any one conduit added to the heat transmitted to the conduit when passing in proximity to the hot air cells will not reach a temperature such as to adversely affect the insulation of the wiring in the conduits.

Referring now to Fig. 4 in a modified form of the invention wherein a portion of the present combination wire and air distributing floor extends parallel to the service core, it is feasible to provide transversely extended conduits 40 connected to accessible fittings 42 providing for communication with selected cells of the wire distributing units 10 to enable the wiring to be fished in both directions of the floor area. As illustrated, one of the transversely extended conduits is connected for distribution of wiring to cells 1 and 3 to provide 110 v. service, for the other transversely extended conduit is connected for distribution of wiring to cells 2 and 4 to provide telephone service. In order to prevent accumulation of a relatively large number of wires in any one conduit, individual supply conduits 30 are provided which may be connected to selected of the accessible fittings 42 and which are provided with a relatively few wires for servicing one or more cells in a wire distributing unit, or for servicing the cells of one or more adjacent wire distributing units. As herein shown, the transversely extended conduits 40 and the supply conduits 30 may be disposed above the cellular metal floor and embedded in the concrete floor fill, access being provided through the flooring for fishing and splicing the wires through the accessible fittings 42 in accordance with the usual practice.

Having thus described the invention, what is claimed is:

A building and combination air and wire distributing structure comprising a cellular metal floor having adjacent longitudinally extended metal cellular units erected side by side, one unit having a plurality of cells each of uniform sectional dimension and each constituting a wiring duct, the other adjacent units having cells of greater sectional dimension than those of the first unit and constituting air carrying ducts, means for conducting hot air from a source of supply to selected of said air carrying cells, an electrical supply panel disposed at one end of the floor area defined by said longitudinally extended cells, each of said wire carrying cells having an individual conduit fitting communicating with an opening in the top wall of its wire carrying cell, said fittings being spaced a substantial distance from said panel and disposed substantially intermediate the ends of said cells, an individual wire carrying conduit for each cell connected between its fitting and said panel, said conduits extending directly to the panel across the top of the cellular metal floor, each conduit being of sufficiently small cross section to accommodate a relatively few wires whereby the heat generated by the resistance of the wiring added to the heat transmitted to the conduit by the hot air cells is below the permissible maximum required by the building codes, and a floor fill on top of the cellular metal floor in which said conduits are embedded.

References Cited in the file of this patent
UNITED STATES PATENTS

| | | |
|---|---|---|
| 2,041,965 | Sargent | May 26, 1936 |
| 2,672,749 | Wiesmann | Mar. 23, 1954 |
| 2,783,639 | Werner | Mar. 5, 1957 |

OTHER REFERENCES

Sweet's 1952 Catalog, sec. 30b/NA, page 3. (Design Div.)